(12) United States Patent
Hong

(10) Patent No.: US 8,720,495 B2
(45) Date of Patent: May 13, 2014

(54) INTEGRATED SUPPLYING APPARATUS FOR GAS AND SIZING

(75) Inventor: David Hong, Causeway Bay (HK)

(73) Assignee: Active Tools International (HK) Ltd., Causeway Bay (HK)

( * ) Notice: Subject to any disclaimer, the term of this patent is extended or adjusted under 35 U.S.C. 154(b) by 31 days.

(21) Appl. No.: 13/616,082

(22) Filed: Sep. 14, 2012

(65) Prior Publication Data

US 2013/0199638 A1 Aug. 8, 2013

(30) Foreign Application Priority Data

Feb. 2, 2012 (TW) .............................. 101201894 A

(51) Int. Cl.
*B65B 31/00* (2006.01)
*B65B 1/04* (2006.01)
*E03B 5/00* (2006.01)
*E03B 11/16* (2006.01)
*F16K 15/20* (2006.01)

(52) U.S. Cl.
USPC ............... 141/38; 141/44; 141/285; 137/223; 137/565.01; 137/614

(58) Field of Classification Search
USPC ............ 141/38, 44, 65, 66, 67, 98, 100, 104, 141/105, 114, 231, 285, 301, 313; 137/565.01, 614, 223, 224, 226, 597, 137/602, 605, 606, 607
See application file for complete search history.

(56) References Cited

U.S. PATENT DOCUMENTS

| | | | |
|---|---|---|---|
| 7,615,122 B2 * | 11/2009 | Mehus et al. | 134/36 |
| 7,748,295 B2 * | 7/2010 | Hong | 81/15.6 |
| 8,286,660 B2 * | 10/2012 | Mevius et al. | 137/484.8 |
| 8,522,833 B2 * | 9/2013 | Chou | 141/38 |
| 2005/0076951 A1 * | 4/2005 | Gray | 137/115.16 |
| 2013/0269811 A1 * | 10/2013 | Hong | 137/876 |
| 2013/0306174 A1 * | 11/2013 | Hong | 137/614.03 |

\* cited by examiner

*Primary Examiner* — Timothy L Maust
*Assistant Examiner* — Brandon J Warner
(74) *Attorney, Agent, or Firm* — Raymond R. Ferrera; Adams and Reese LLP

(57) ABSTRACT

The present invention discloses an integrated supplying apparatus for gas and sizing. It comprises a sizing barrel, a gas supply unit and a switching unit. The sizing barrel and the gas supply unit are both connected with the switching unit. When the switching unit is fixed in a first state by a safety cover, the gas supply unit can only output high pressure gas through the switching unit. When the switching unit is converted into a second state by releasing the safety cover, the gas supply unit in turn outputs some high pressure air into the sizing barrel through the switching unit, so that the sizing inside the sizing barrel is output under the action of the gas pressure and the gas inside the sizing barrel is then output when completing the output of the sizing.

7 Claims, 9 Drawing Sheets

INTEGRATED SUPPLYING APPARATUS FOR GAS AND SIZING

CROSS-REFERENCE TO RELATED APPLICATIONS

Pursuant to 35 U.S.C. 119(a), the instant application claims priority to prior Taiwan application number 101201894, filed Feb. 2, 2012.

FIELD OF THE INVENTION

The present invention relates to an integrated supplying apparatus for gas and sizing, and specifically relates to a structure that integrates the output pipelines respective for supplying sizing and gas so as to prevent users from any misapplication.

BACKGROUND OF THE INVENTION

The vehicle cannot run after its tire ruptures and the tire pressure is lost. Such that, only the tire is replaced or repaired and then inflated, can the vehicle go on running. Accordingly, the vehicle is generally equipped with a spare tire as required. However, the weight of the tire together with the rim will increase that of the vehicle body, and consequently increase the fuel consumption. This is neither economical nor environmental friendly. In order to reduce the vehicle load produced by one spare tire, a relative legerity tire repair machine is currently developed by manufacturers to provide for the drivers in the vehicle. When the tire is flat due to rupture, such tire repair machine can be used to repair and inflate the tire in emergency.

The known tire repair machine may also be used as a tire inflator, the structure thereof is composed of a sizing barrel and an air compressor provided in a housing, wherein, the sizing barrel and the air compressor are respectively connected with a sizing injection tube and an inflation tube, one end of the sizing injection tube and one end of the inflation tube are respectively provided with a sizing injection nozzle and an air intake nozzle. When used as a tire inflator, the air intake nozzle is combined to the air nozzle of the tire directly by the user. After that, the air compressor is powered on and high pressure air will be filled into the tire. When used as a tire repair machine, the sizing injection nozzle is firstly combined to the air nozzle of the tire. The pump is powered on to inject a proper quantity of sizing from the sizing barrel into the tire. Then the sizing injection nozzle is removed and alternatively the air intake nozzle is combined to the air nozzle of the tire. After that, the high pressure air is inflated to the tire to reach an appropriate tire pressure. After the air intake nozzle is removed, let the vehicle run a distance slowly, during running, the sizing can flow uniformly on the inner wall surface of the tire to fill up the position of the rupture. The solidified sizing can avoid gas leakage. Therefore, the driver can drive the vehicle to the nearest maintenance for further inspection.

Although the housing is marked with the operation method of the aforementioned tire repair machine, it is always difficult for those people who are not familiar with machine operation to distinguish whether the inflation tube or the sizing injection tube should be used at first. Moreover, misusage is also possible even for the people familiar with the operation. Therefore, the function of sizing injection is used by mistake when only the tire inflation is required. This may result in that some sizing is injected into the tire and air nozzle, and all of the air nozzle, sizing injection tube and the sizing injection nozzle must be replaced.

SUMMARY OF THE INVENTION

The purpose of the present invention is to solve the existing problems that, for a supplying apparatus for gas and sizing which is applied to the tire repair machine, since the gas and sizing are respectively connected with the inflation tube and the sizing injection tube and then further supplied separately, it is difficult for users to determine which of the inflation tube and the sizing injection tube should be used firstly; or the sizing injection may be used by mistake when only an air inflation is required.

In the present invention, an integrated supplying apparatus for gas and sizing is provided, which comprises a sizing barrel, a gas supply unit and a switching unit; the sizing barrel and the gas supply unit are both connected with the switching unit; wherein when the switching unit is fixed in a first state by a safety cover, the gas supply unit can only output high pressure gas through the switching unit; when the switching unit is converted into a second state by releasing the safety cover, the gas supply unit in turn outputs high pressure gas into the sizing barrel through the switching unit, so that the sizing inside the sizing barrel is output under the action of the gas pressure, and the gas inside the sizing barrel is then output when completing the output of the sizing.

The technical solution of the present invention includes a sizing barrel, a gas supply unit and a switching unit; wherein the sizing barrel is provided with at least one gas inlet and at least one outlet for gas and sizing, and it is also loaded with sizing; the gas supply unit comprises an air compressor; and the switching unit comprises a valve seat, a plunger and a linkage part. The valve seat has a plunger hole and four vias (i.e. a first via, a second via, a third via and a fourth via) for connecting the inside and outside of the plunger hole. The first via is connected with a gas outlet of the air compressor, the second one is connected with a filling nozzle, the third one is connected with the outlet for gas and sizing of the sizing barrel, and the fourth one is connected with the gas inlet of the sizing barrel. The plunger has a central hole extending axially throughout to one end of the plunger. Besides, the plunger also has a first annular region, a second annular region and a third annular region on its outer diameter, wherein a first through hole and a second through hole are arranged in the plunger wall of the first and third annular regions, and both ends of the first, second and third annular regions are arranged with a leakage stop ring respectively. The plunger is combined to the plunger hole of the valve seat so that the plunger can move axially between a first stroke and a second stroke that are in the opposite direction relative to each other in the plunger hole. When the plunger has moved to the first stroke, the first via is connected to the second via through the second annular region, in which case the gas is directly output by the second via. When the plunger has moved to the second stroke, the first via is connected to the first through hole through the first annular region, the third via is connected to the second via through the second annular region, and the fourth via is connected to the second through hole through the third annular region. In this case, the gas is eventually input into the sizing barrel through the fourth via, so that the sizing inside the sizing barrel is output by virtue of the third and second vias under the action of gas pressure. The linkage part is connected with the plunger so as to make the latter move between the first and second stroke.

In order to connect the valve seat with the air compressor and the sizing barrel in a better way, the switching unit of the present invention is further comprised of a joint seat. The joint seat has a first gas inlet, a first gas outlet, a second gas inlet and a second gas outlet; wherein, the first gas inlet is connected with the gas outlet of the air compressor, the first gas outlet is connected with the first via of the valve seat, the second gas inlet is connected with the third via of the valve seat, and the second gas outlet is connected with the outlet for gas and sizing of the sizing barrel.

In order to facilitate the operation of a user, the linkage part of the present invention includes a connecting rod and an operating component. Herein, the two ends of the connecting rod are respectively connected with the plunger and the operating component, and one end of the operating component is pivoted to the valve seat. When the operating component is being operated, the plunger is driven to move between the first stroke and the second stroke by virtue of the connecting rod. Besides, the operating component is disposed with a protruding part, which is further arranged with a cover body.

In the present invention, all of the sizing barrel, the gas supply unit and the switching unit are disposed inside a housing so as to ensure an easy operation for the user and prevent faulty operation. An opening with the safety cover is arranged on the housing, and the safety cover is further equipped with a retaining part. As such, when the plunger is in the first state of the first stroke, the safety cover can cover such opening and the retaining part can block the lower part of the protruding part so as to prevent the operating component from being operated. When the safety cover is opened, the retaining part is removed from the lower part of the protruding part so that the operating component can be operated.

In order to enable the users to know the pressure of the output gas clearly, a gas distributing head is connected with the gas outlet of the air compressor in the present invention. The gas distributing head is provided with a first outlet and a second outlet; wherein the former is connected with the first gas inlet of the joint seat, and the latter is connected with a pressure gauge installed on the housing.

The integrated supplying apparatus for gas and sizing provided in the present invention is applied to tire repair machines, in which the sizing is used as the material for filling in the hole of a broken tire.

BRIEF DESCRIPTION OF THE DRAWINGS

The present invention will be further described with reference to accompanying drawings and embodiments in the following. In the figures.

| Reference Signs | |
|---|---|
| A | Tire Repair Machine |
| B | Switching Unit |
| 1 | Gas Supply Unit |
| 11 | Motor |
| 12 | Air Compressor |
| 13 | Gas Distributing Head |
| 130 | Inlet |
| 131 | First Outlet |
| 132 | Second Outlet |
| 2 | Joint Seat |
| 21 | First Gas Inlet |
| 22 | First Gas Outlet |
| 23 | Second Gas Inlet |
| 24 | Second Gas Outlet |
| 25 | Screw Hole |
| 26 | Fixing Component |
| 3 | Valve Seat |
| 31 | Plunger Hole |
| 32 | First Via |
| 33 | Second Via |
| 34 | Perforation |
| 35 | Screw |
| 36 | Third Via |
| 37 | Fourth Via |
| 4 | Plunger |
| 40 | Central Hole |
| 41 | Plunger Body |
| 411 | First Annular Region |
| 412 | Second Annular Region |
| 413 | Third Annular Region |
| 42 | First Through Hole |
| 43 | Second Through Hole |
| 44 | Leakage Stop Ring |
| 5 | Sizing Barrel |
| 51 | Outlet for Gas and Sizing |
| 52 | Gas Inlet |
| 53 | Connection Nozzle |
| 54 | Air Supply Pipe |
| 6 | Linkage Part |
| 61 | Connecting Rod |
| 611 | Pivot |
| 62 | Operating Component |
| 621 | Protruding Part |
| 622 | Cover Body |
| 7 | Housing |
| 71 | Lower Shell |
| 711 | Opening |
| 72 | Upper Shell |
| 73 | Safety Cover |
| 731 | Retaining Part |
| 74 | Pressure Gauge |
| 75 | Display Panel |

DETAILED DESCRIPTION OF THE PREFERRED EMBODIMENT

Below the implementation of the present invention is explained in more detail in coordination with schemas and component symbols so that those skills familiar with this technology can practice the present invention after reading the specification.

Figure 1:
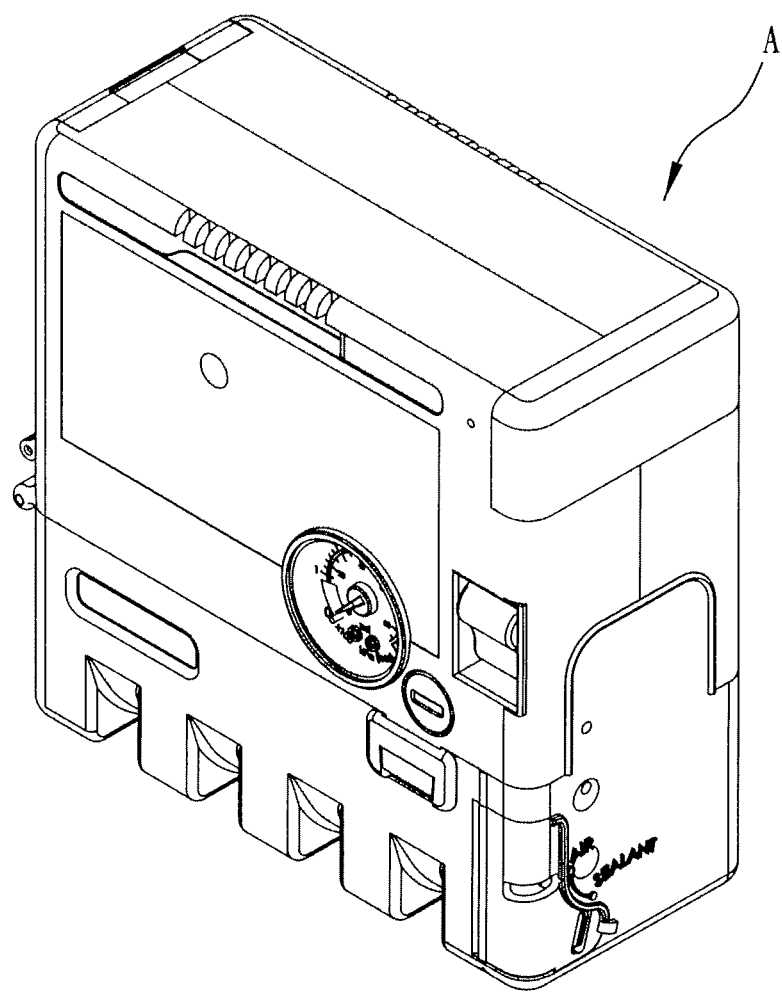
FIG. 1 is a stereograph illustrating an embodiment of the appearance structure of the present invention.

An integrated supplying apparatus for gas and sizing provided in the present invention can be applied to the tire repair machine A as shown in FIG. 1.

Figure 2:
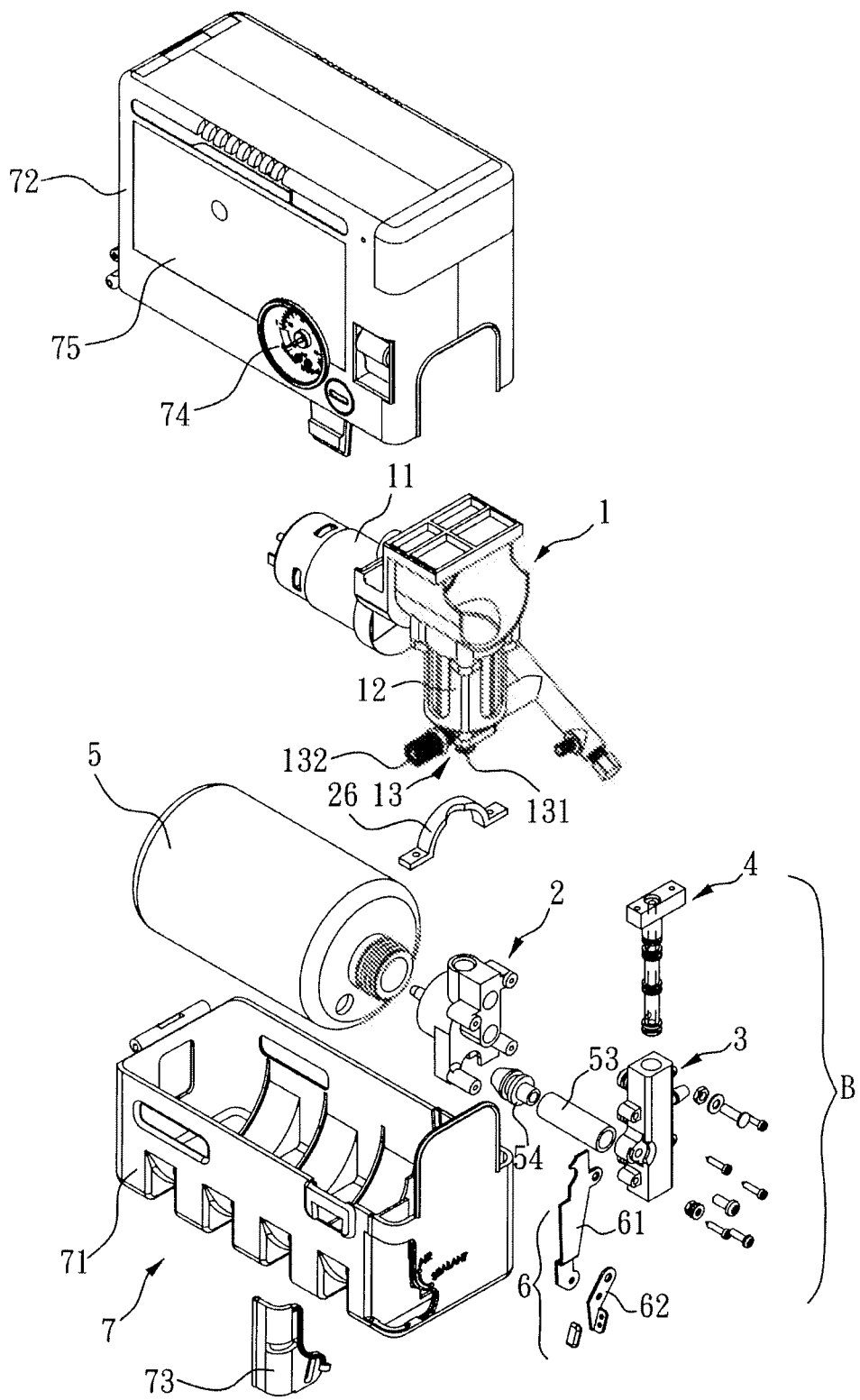
FIG. 2 is an exploded view illustrating the combination relation of the main components of the present invention.
Figure 3:
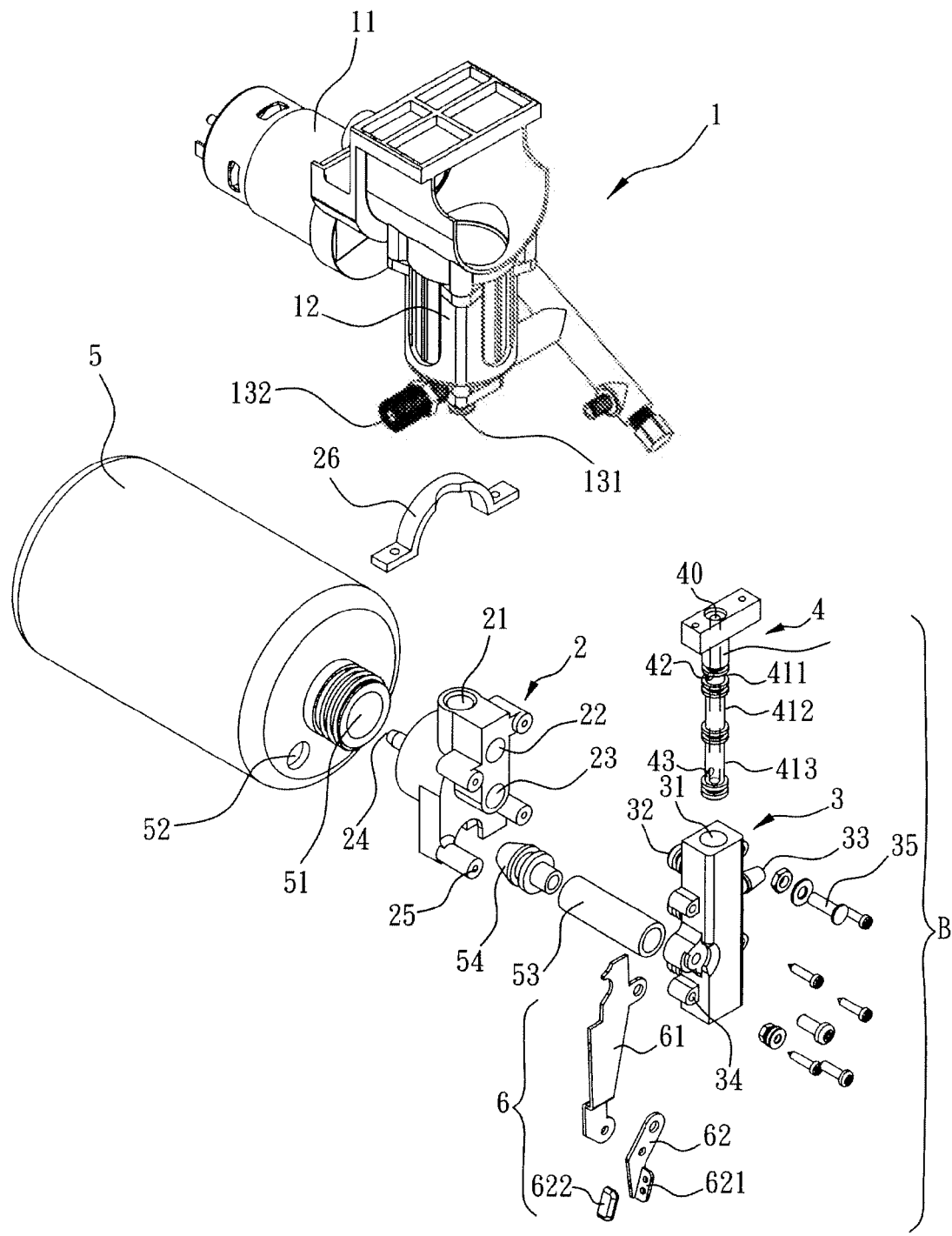
FIG. 3 is an exploded view illustrating the combination relation of the main components of the supplying apparatus in the present invention.
Figure 4:
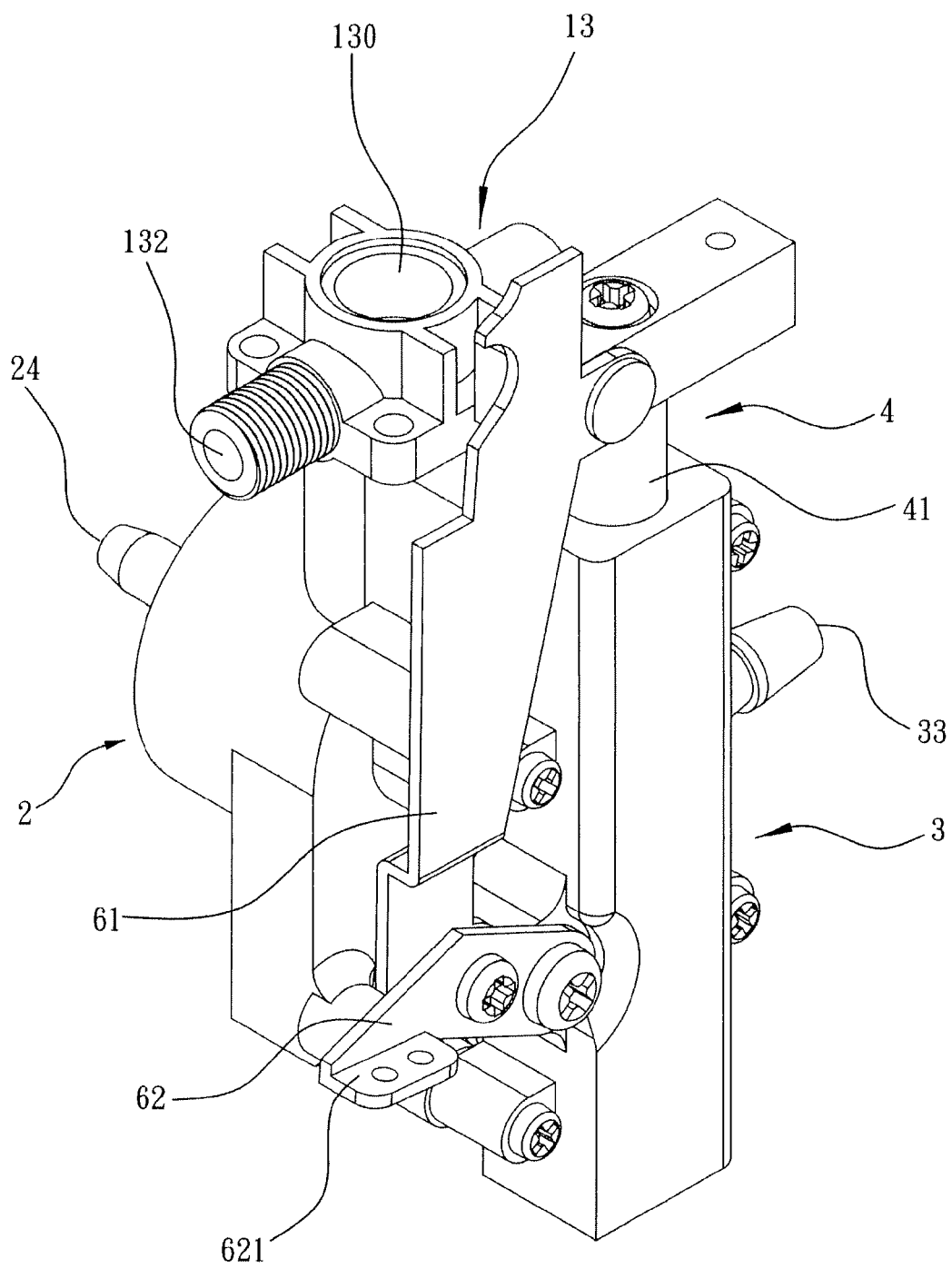
FIG. 4 is a stereograph illustrating the appearance structure of the supplying apparatus in the present invention.

As shown in FIGS. 2, 3 and 4, for the integrated supplying apparatus for gas and sizing provided in the present invention, its preferred embodiment includes a gas supply unit 1, a sizing barrel 5 and a switching unit B. The gas supply unit 1 further comprises an air compressor 12 that is connected with a motor 11 and a gas distributing head 13. The gas distributing head 13 is provided with an inlet 130, a first outlet 131 and a second outlet 132; wherein the inlet 130 is connected with a gas outlet (not shown in the figure) of the air compressor 12. Herein, when the motor 11 is energized by electric power, it can drive the air compressor 12 to produce high pressure air which can simultaneously flow out through the first outlet 131 and the second outlet 132. The sizing barrel 5 is one kind of container operable to hold the sizing for sealing and repairing a tire. It is provided with a gas inlet 51 and an outlet for gas and sizing 52; wherein the former is only operable to provide a channel for air flowing through, while the latter is operable to provide a channel for both air and sizing flowing through. The outlet for gas and sizing 52 is arranged at the mouth of the sizing barrel 5. The mouth is provided with an external thread so as to be screwed with a joint seat 2 of the following switching unit B. On the other hand, the gas inlet 51 can be combined with a connection nozzle 53 which is further combined with a gas supply tube 54. The gas supply tube 54 can then be connected with a fourth via 37 of the switching unit B which will be described in the following.

In a preferred embodiment of the present invention, the switching unit B includes a joint seat 2, a valve seat 3, a plunger 4 and a linkage part 6. Herein, the joint seat 2 can be firstly molded by casting and further be processed to form a first gas inlet 21, a first gas outlet 22, a second gas inlet 23 and a second gas outlet 24; wherein the first gas inlet 21 is connected with the first gas outlet 22, and the second gas inlet 23 in turn is connected with the second gas outlet 24. The joint seat 2 is provided with two or more screw holes 25 by its side so as to be combined with the valve seat 3. Besides, the first gas inlet 21 is operable to combine with the first outlet 131 of the gas distributing head 13.

The valve seat 3 can also be molded by casting and further be processed to form a plunger hole 31 and four vias (i.e. a first via 32, a second via 33, a third via 36 and a fourth via 37) connecting with the plunger hole 31. Taken an upright axis of the plunger hole 31 as the reference, such four vias 32, 33, 36 and 37 are located in positions with different heights. In detail, the first via is in the highest position, which is followed by the second and third vias 33 and 36 in sequence, and the fourth via 37 is in the lowest position. Several perforations 34 corresponding to the screw holes 25 of the joint seat 2 is provided by the side of the valve seat 3. Herein, screws 35 can be used to pass through these perforations 34 and then lock into the respective screw hole 25 of the joint seat 2 so as to combine and fix the valve seat 3 to the joint seat 2. When the valve seat 3 and the joint seat 2 are combined together, the first via 32 and the second via 36 provided in the cylindrical body insert into the first gas outlet 22 and the second gas inlet 23 respectively. Moreover, the inner diameter of the cylindrical body, the first via 32 and the third via 36 are sealed by virtue of a leakage stop ring 44. The second via 33 is connected with a filling tube (now shown in the figure) with a filling nozzle arranged at one end thereof.

Figure 9:
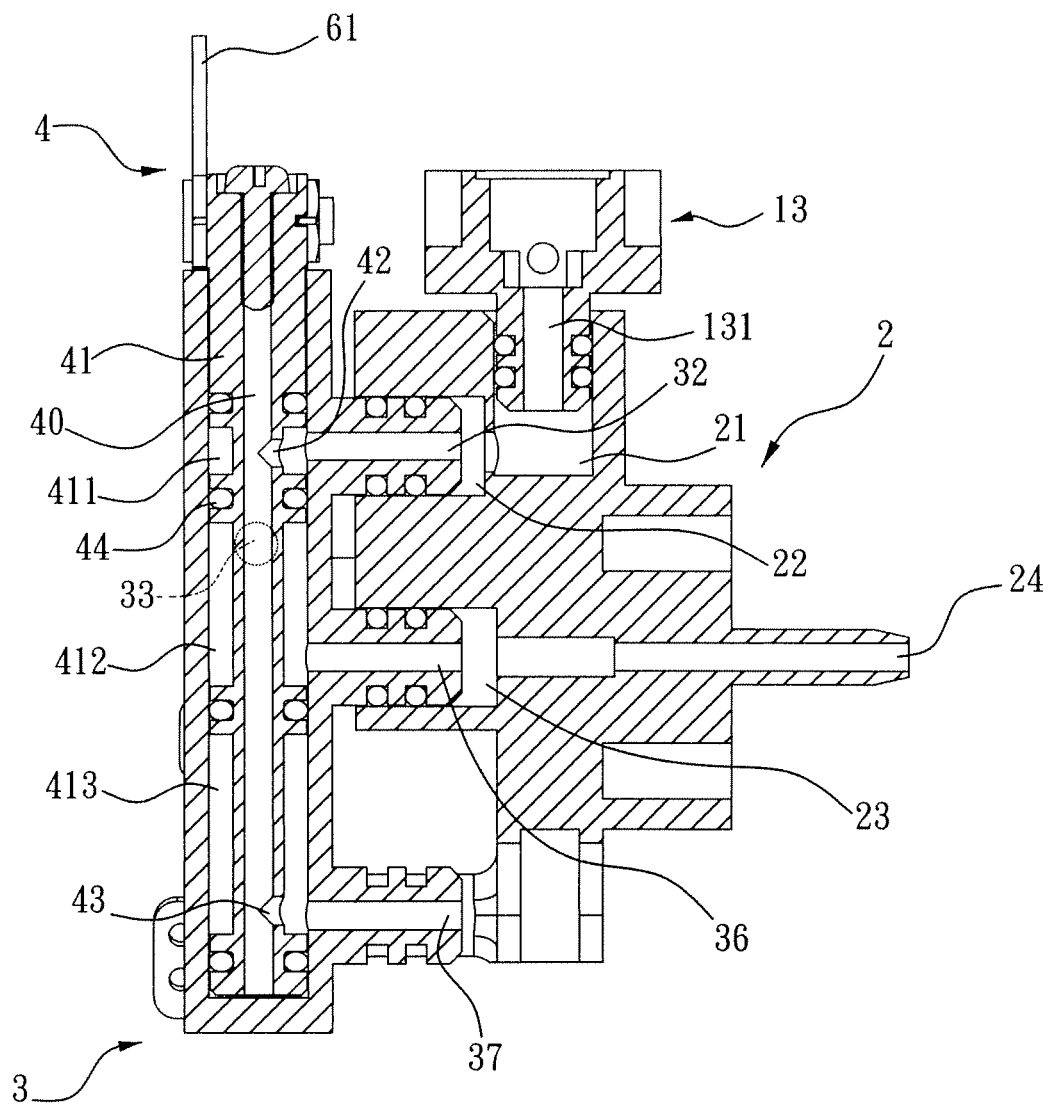
FIG. 9 is a sectional view taken in the direction of the arrows B-B in FIG. 8.

The plunger 4 of the switching unit B is a cylindrical body which almost has the same outer diameter as the inner diameter of the plunger hole 31 of the valve seat 3. The plunger 4 has a central hole 40 extending axially throughout to one end of the plunger. The plunger 4 is processed to form a first annular region 411, a second annular region 412 and a third annular region 413 on its outer diameter, wherein the diameter at the bottom of these annular regions is smaller than the outer diameter of the plunger 4, a first through hole 42 and a second through hole 43 are arranged on the plunger wall of the first and third annular regions 411 and 413, and both ends of the first, second and third annular regions 411, 412 and 413 are provided with a leakage stop ring 44 respectively. When the plunger 4 is combined to the plunger hole 31 of the valve seat 3, the leakage stop ring 44 is used to implement the sealing between the plunger 4 and the plunger hole 31 so as to prevent gas leakage. At this moment, the plunger 4 can move axially between a first stroke and a second stroke that are in the opposite direction relative to each other in the plunger hole 31. In the embodiment shown in FIG. 7, the first stroke refers to a limit where the plunger 4 can move upwards as possible, and the second stroke in turn refers to a limit where the plunger 4 can move downwards as possible. Herein, when the plunger 4 has moved to the first stroke, the second via 32 is corresponding to the position of the second annular region 412, so that the first via 32 is connected to the second via 33 through the second annular region 412. As shown in FIG. 9, when the plunger 4 has moved to the second stroke, the first via 32 is corresponding to the position of the first annular region 411, so that the first via 32 is connected to the first through hole 42, the third via 36 is connected to the second via 33 through the second annular region 412, and the fourth via 37 is connected to the second through hole 43 through the third annular region 413.

Figure 6:
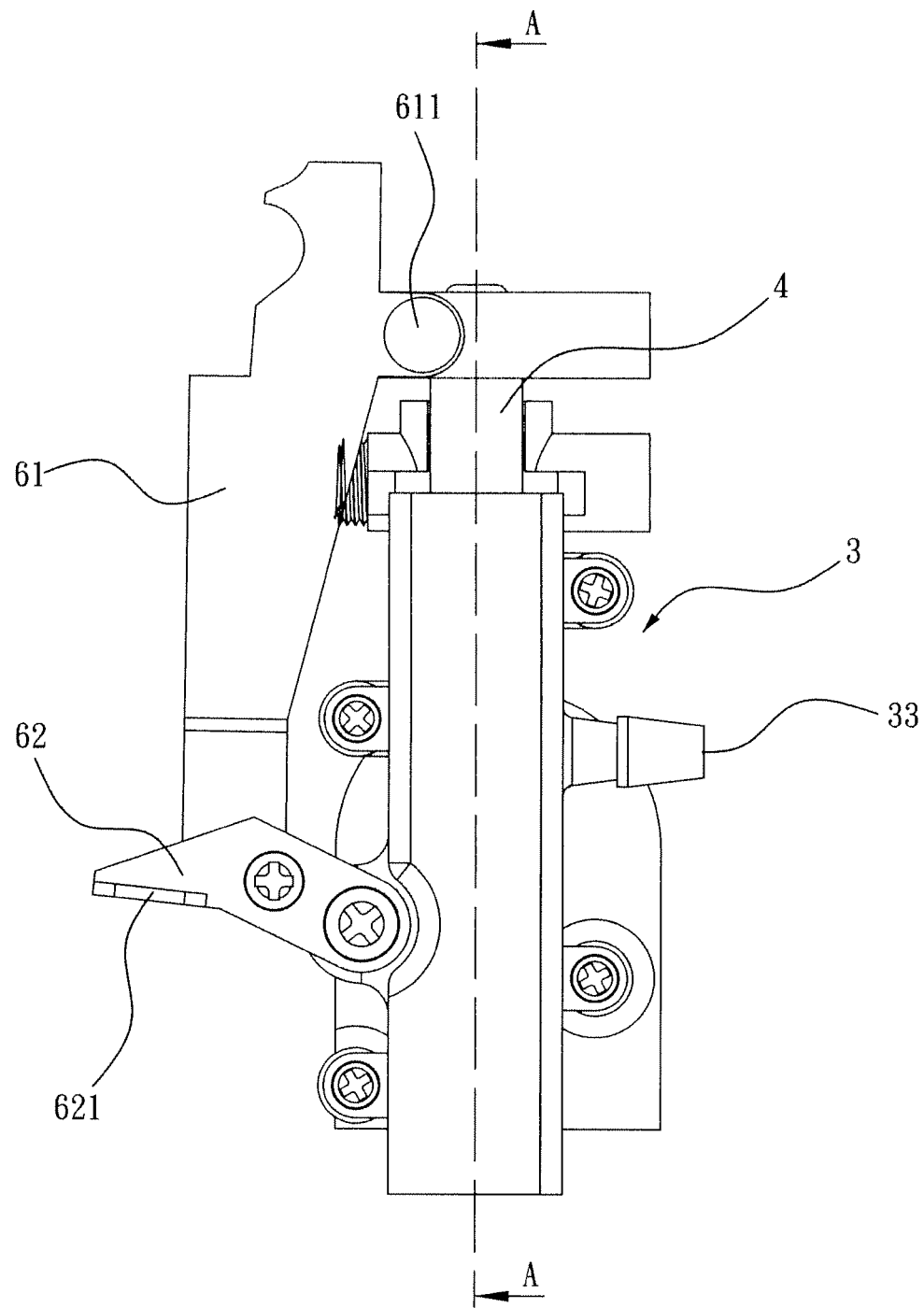
FIG. 6 is a plan view illustrating the appearance of the supplying apparatus after it has been set in the state of air supply in the present invention.
Figure 7:
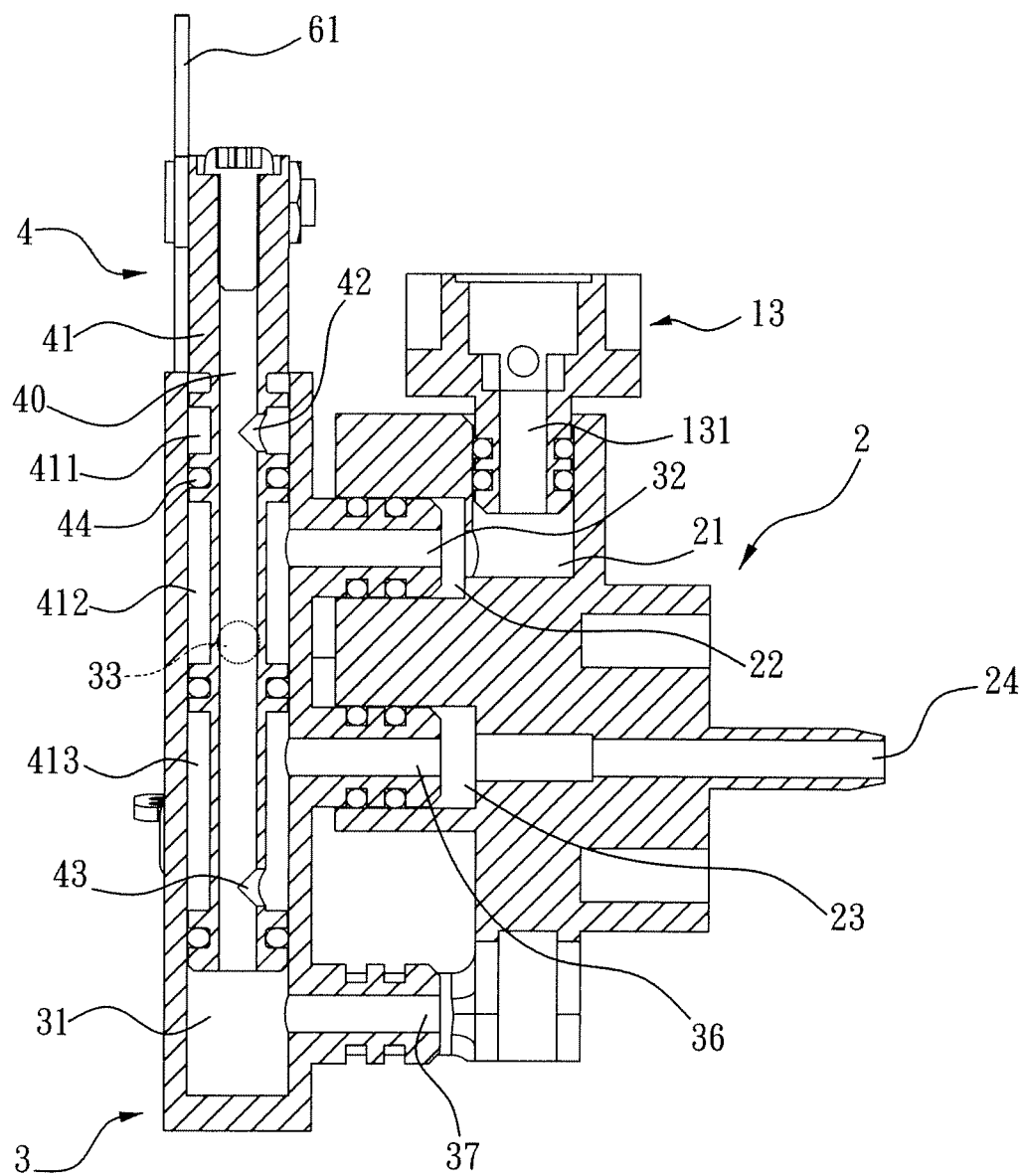
FIG. 7 is a sectional view taken in the direction of the arrows A-A in FIG. 6.

The linkage par 6 of the switching unit B is used to connect the plunger 4 so as to make the plunger 4 move between the first and second stroke, thereby controlling the operating apparatus for outputting the gas or sizing. The linkage part 6 of the present invention includes a connecting rod 61 and an operating component 62. Herein, a first end of the connecting rod 61 is pivoted to the upper end of the plunger 4 by a pivot, a second end of the connecting rod 61 is pivoted to the operating component 62, and one end of the operating component 62 is pivoted to the valve seat 3 at a proper position. The operating component 62 has a protruding part 621 which is molded by bending and further provided with a cover body 622. By virtue of such cover body 622, it is convenient for the user to touch and operate by his/her fingers. As shown in FIGS. 6 and 7, when the operating component 62 is wrenched upward, the plunger 4 is driven to move towards the first stroke under the linkage action of the operating component 62 and the connecting rod 61, in which case the aforementioned first outlet 131, the first via 32 and the second via 33 together form a path. A shown in FIGS. 8 and 9, when the operating component 62 is wrenched downward, the plunger 4 is driven to move towards the second stroke under the linkage action of the operating component 62 and the connecting rod 61, in which case the aforementioned first outlet 131, the first through hole 42, the central hole 40, the second through hole 43 and the fourth via 37 together form a path. At this moment, the second gas outlet 24, the third via 36 and the second via 33 together form a path as well.

Figure 5:
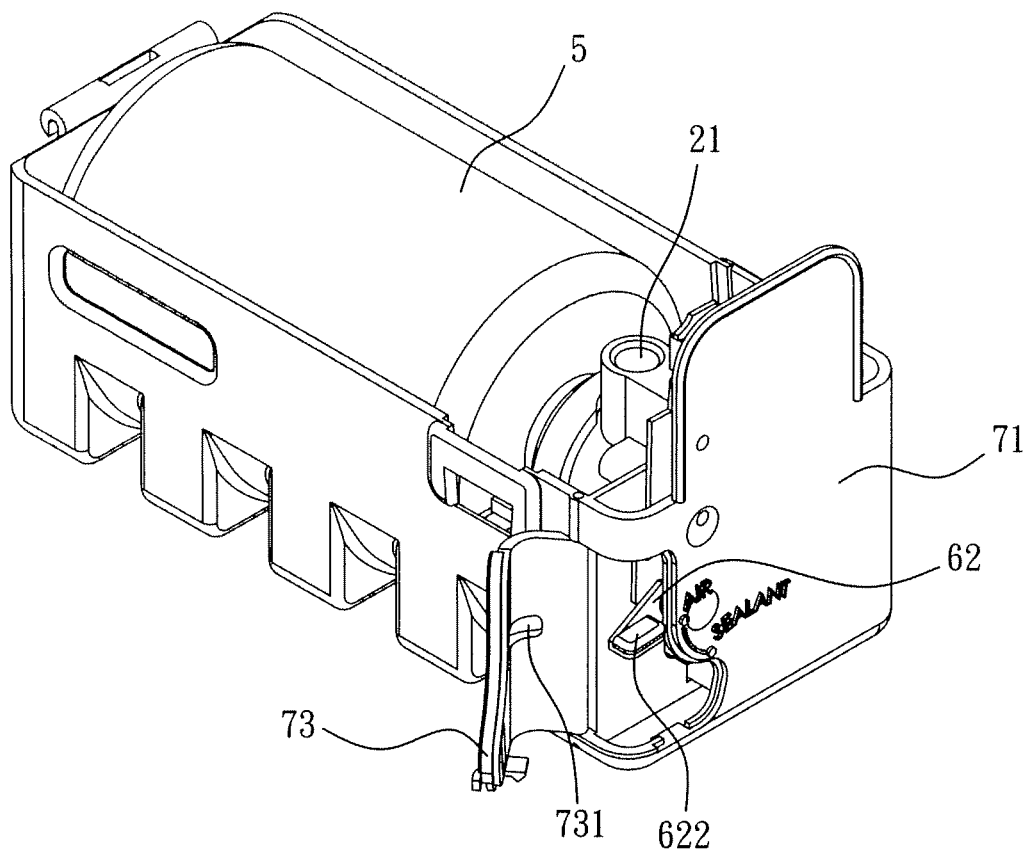
FIG. 5 is a stereograph illustrating the partial appearance structure of the supplying apparatus after it has been mounted in the machine body in the present invention.

As shown in FIG. 2 again, the aforementioned sizing barrel 5, the gas supply unit 1 and the switching unit B are all arranged inside a housing 7. In a preferred embodiment of the present invention, the housing 7 is comprised of a lower shell 71 and an upper shell 72, wherein the joint seat 2 is fixed within the lower shell 71 by utilization of a fixing component 26. The fixing component 26 is in the shape of circular arc so that it can be sheathed around the curved surface part of the joint seat 2 and then fixed to the lower shell 71 by screw. The lower shell 71 is provided with an opening 711, and a safety cover 73 is provided by one side of the opening 711. Herein, the safety cover 73 is provided with a retaining part 731 protruding from the inner side of the safety cover 73 (as shown in FIG. 5). When the aforementioned sizing barrel 5, the gas supply unit 1 and the switching unit B are firstly assembled in the lower shell 71, the upper shell 72 is then combined above the lower shell 71. Again as shown in FIG. 5, the function of the safety cover 73 in the present invention is described as follows: when the plunger 4 is in the state where it is located in the first stroke (i.e. when the operating component 62 is wrenched upward), the safety cover 73 can cover such opening 711 and the retaining part 731 can block the lower part of the protruding part 621 of the operating component 62 so as to prevent the operating component 62 from being operated. In such state, the integrated supplying apparatus of the present invention can be only used for outputting high pressure air, and it is also prevented from outputting the sizing, so that the user is free of mis-operation. Instead, when the user plans to repair the tire by virtue of some outputted sizing, the safety cover 73 has to be opened at first, so that the retaining part 731 is removed from blocking the protruding part 621. Thereafter, the operating component 62 can be wrenched downward by the user, so that the plunger 4 can move to the second stroke to output the sizing.

The upper shell 72 can be further provided with a display panel 75 and a pressure gauge 74. Herein the pressure gauge 74 is connected with the second outlet 132 of the gas distributing head 13 by a pipeline. Accordingly, the air pressure fed to the joint seat 2 by the air compressor 12 can be displayed by the pressure gauge 74 synchronously, in which case the user can determine and adjust the inflation time accordingly. The display panel 75 can be a light guide plate with an inclined surface and a backlight (not shown in the figures) on its backside. It is arranged on the surface of the housing 7 so as to display the related information more clearly.

The operation method of the present invention is shown as follows.

The tire repair machine A can be carried in a vehicle by the user. In this way, in the event that the user determines to inflate a tire by himself without obtaining tire inflation service from an automobile repair station, this tire repair machine A can be taken out for usage. Without taking off the safety cover 73 (as shown in FIG. 1 and FIG. 6), the operating component 62 of the linkage part 6 is maintained in an upper position; that is, the plunger 4 is maintained in the state where it is located in the first stroke. At this moment, the user starts the power supply so that the motor 11 can drive the air compressor 12 to produce high pressure gas, wherein the high pressure gas simultaneously flows out through the first outlet 131 and the second outlet 132 and the gas pressure can be further displayed on the pressure gauge 74. As shown in FIG. 7, the high pressure gas flowing out from the first outlet 131 subsequently flows out from the second via 33 by passing through the first gas inlet 21, the first via 32 and the second annular region 412, finally, the high pressure gas can be used for the air inflation on the tire via the inflation tube and the filling nozzle (not shown in the figure).

Figure 8:
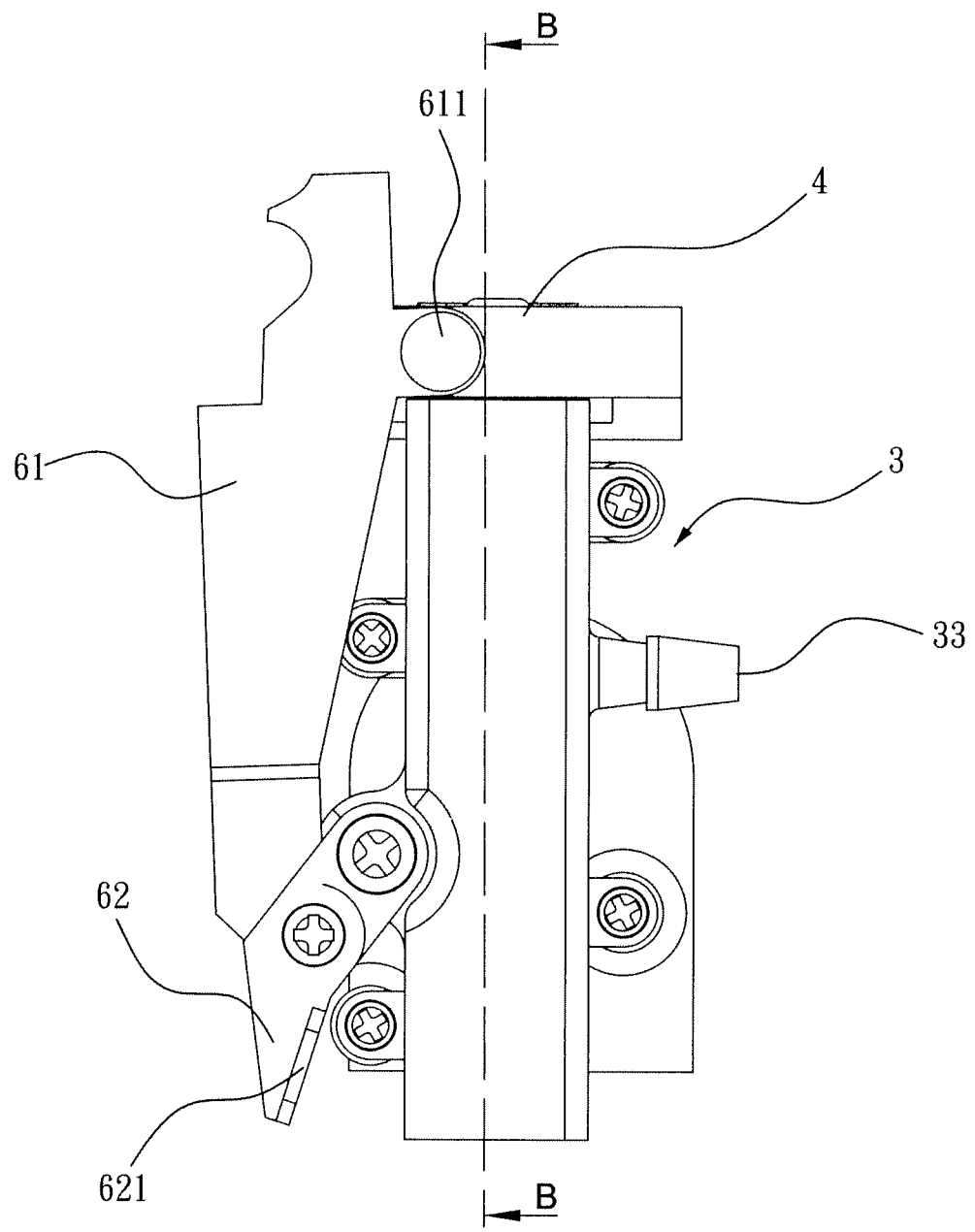
FIG. 8 is a plan view illustrating the appearance of the supplying apparatus after it has been set in the state of sizing supply in the present invention.

When it is intended to repair a tire with rupture and air leakage, the safety cover 73 has to be opened at first so that the retaining part 731 is removed from blocking the operating component 62. In this case, the operating component 62 can be wrenched downward, and the plunger 4 can be moved axially toward the second stroke under the linkage action of the connecting rod 61 (as shown in FIGS. 8 and 9). Herein, the first annular region 411 of the plunger 4 moves to a position corresponding to the first via 32, the second annular region 412 moves to a position corresponding to the third via 36, and the third annular region 413 moves to a position corresponding to the fourth via 37. Thus, the high pressure gas flowing out from the first outlet 131 subsequently enters the sizing barrel 5 by passing through the first gas inlet 21, the first via 32, the first annular region 411, the first through hole 42, the central hole 40, the second through hole 43 and the fourth via 37. In this case, the sizing inside the sizing barrel 5 is pushed out through the outlet for gas and sizing 51 under the action of the air pressure. The sizing then flows out from the second via 33 by passing through the second gas outlet 24, the third via 36 and the second annular region 412. After that, the sizing is injected into the tire via a filling line connected with the second through hole 32 and a filling nozzle connected with the air nozzle of the tire. When all the sizing inside the sizing barrel is used up, the gas inside the sizing barrel 5 is continued to be injected into the tire so that a certain pressure can be maintained within the tire. In the following, the filling nozzle is dismounted immediately, and the vehicle is made to run slowly for a certain distance in such a way the sizing can flow uniformly along the surface of the inner wall of the tire to fill in the rupture location. The sizing can prevent the air inside the tire from leakage when it is solidified. In this case, the driver can drive the vehicle to a repair station nearby for further overhauling.

The preferred embodiments mentioned above are only intended to illustrate the present invention. Instead, they are not intended to limit the present invention in any form. Therefore, any modifications or alternations related to the present invention should be included in the scope of present invention, as long as they are made within the spirit of the present invention.

The invention claimed is:

1. An integrated supplying apparatus for gas and sizing, comprising:
   a sizing barrel including at least one gas inlet and at least one outlet for gas and sizing;
   wherein the sizing barrel is loaded with sizing;
   a gas supply unit comprising an air compressor;
   a switching unit comprising a valve seat, a plunger, and a linkage part;
   wherein the valve seat has a plunger hole;
   wherein the valve seat also has a first via, a second via, a third via, and a fourth via for connecting the inside and outside of the plunger hole;
   wherein the first via is connected with a gas outlet of the air compressor, the second via is connected with a filling nozzle, the third via is connected with the outlet for gas and sizing of the sizing barrel, and the fourth via is connected with the gas inlet of the sizing barrel;
   wherein the plunger has a central hole extending axially throughout to one end thereof;
   wherein the plunger also has a first annular region, a second annular region, and a third annular region on an outer diameter thereof;
   wherein a first through hole and a second through hole are arranged in the plunger wall of the first and third annular regions respectively, and both ends of the respective first, second, and third annular regions include a leakage stop ring respectively;
   wherein the plunger is combined to the plunger hole of the valve seat so that the plunger can move axially between a first stroke and a second stroke that are in the opposite direction relative to each other in the plunger hole;
   when the plunger has moved to the first stroke, the first via is connected to the second via through the second annular region, in which case the gas is directly output by the second via;
   when the plunger has moved to the second stroke, the first via is connected to the first through hole through the first annular region, the third via is connected to the second via through the second annular region, and the fourth via is connected to the second through hole through the third annular region, in which case the gas is eventually input into the sizing barrel through the fourth via, so that the sizing inside the sizing barrel is output by virtue of the third and second vias under the action of gas pressure;

wherein the linkage part is connected with the plunger so as to make the plunger move between the first stroke and the second stroke.

2. The integrated supplying apparatus for gas and sizing of claim 1, wherein the switching unit also includes a joint seat;

wherein the joint seat has a first gas inlet, a first gas outlet, a second gas inlet, and a second gas outlet;

wherein the first gas inlet is connected with the gas outlet of the air compressor, the first gas outlet is connected with the first via of the valve seat, the second gas inlet is connected with the third via of the valve seat, and the second gas outlet is connected with the outlet for gas and sizing of the sizing barrel.

3. The integrated supplying apparatus for gas and sizing of claim 1, wherein the linkage part includes a connecting rod, the connecting rod having two ends, and an operating component;

the two ends of the connecting rod are respectively pivoted to the plunger and the operating component, and one end of the operating component is pivoted to the valve seat;

when the operating component is being operated, the plunger is driven to move between the first stroke and the second stroke by virtue of the connecting rod.

4. The integrated supplying apparatus for gas and sizing of claim 3, wherein the operating component includes a protruding part, which further includes a cover body.

5. The integrated supplying apparatus for gas and sizing of claim 4, wherein all of the sizing barrel, the gas supply unit, and the switching unit are arranged inside a housing;

the housing includes an opening with a safety cover, and the safety cover further includes a retaining part;

when the plunger is in the first state of the first stroke, the safety cover can cover such opening and the retaining part can block the lower part of the protruding part so as to prevent the operating component from being operated;

when the safety cover is opened, the retaining part is removed from the lower part of the protruding part so that the operating component can be operated.

6. The integrated supplying apparatus for gas and sizing of claim 5, wherein a gas distributing head is connected with the gas outlet of the air compressor;

the gas distributing head includes a first outlet and a second outlet;

wherein the first outlet is connected with the first gas inlet of the joint seat, and the second outlet is connected with a pressure gauge installed on the housing.

7. The integrated supplying apparatus for gas and sizing of claim 1, wherein the integrated supplying apparatus for gas and sizing is applied to tire repair machines, in which the sizing is used as a material for filling in the hole of a broken tire.

\* \* \* \* \*